United States Patent [19]

Liu

[11] Patent Number: 5,631,906
[45] Date of Patent: May 20, 1997

[54] MEDIUM ACCESS CONTROL PROTOCOL FOR SINGLE BUS FAIR ACCESS LOCAL AREA NETWORK

[76] Inventor: Zheng Liu, 6173 Knoll La. Ct., Apt. 102, Willowbrook, Ill. 60514

[21] Appl. No.: 190,383

[22] Filed: Feb. 1, 1994

Related U.S. Application Data

[63] Continuation-in-part of Ser. No. 29,882, Mar. 11, 1993, Pat. No. 5,402,422.

[51] Int. Cl.⁶ ........................................................ H04J 3/00
[52] U.S. Cl. ........................................ 370/455; 340/825.5
[58] Field of Search ............................... 370/85.1, 85.4, 370/85.6, 44.1, 60, 85.8, 85.2, 85.3, 85.5; 340/825.05, 825.5, 825.51, 825.52, 825.08

[56] References Cited

U.S. PATENT DOCUMENTS 5,208,805  5/1993  Ochiai ................................. 370/85.6

Primary Examiner—Douglas W. Olms
Assistant Examiner—Dang Ton
Attorney, Agent, or Firm—Rudnick & Wolfe

[57] ABSTRACT

A method provides for priority data transmission utilizing medium access control protocol with a fair cell-access scheme having a two-level priority for access in a local area network having a unidirectional looped bus and a plurality of network stations coupled to the bus for asynchronous cell transmissions from one network station to other network stations. A-head-of-bus is used to generate continuously time slots to the bus. Each of the time slots includes a busy bit, a high priority slot reserved bit, a low priority slot reserved bit, a high priority slot reservation bit, and a low priority slot reservation bit. The method further extends the two-level cell access to n-level cell access. Each of the time slots thus includes a busy bit, n priority slot reserved bits, and n priority slot reservation bits. The medium access control protocol makes use of the busy bit, the priority slot reserved bits, and the priority slot reservation bits so as to provide fair bandwidth sharing by all of the network stations connected to the bus.

17 Claims, 5 Drawing Sheets

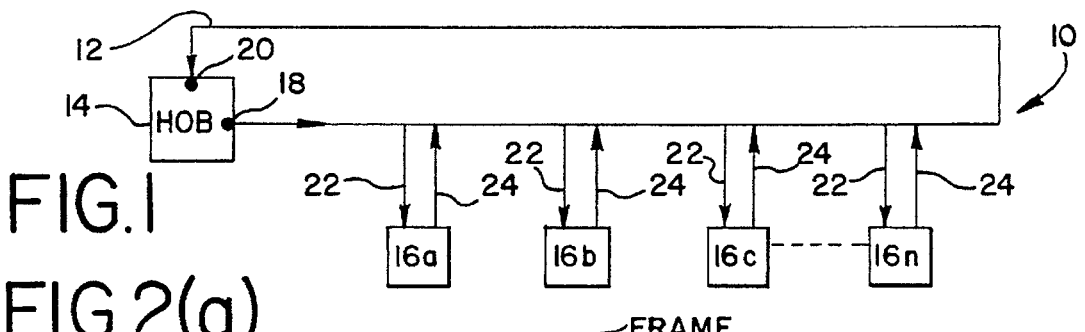
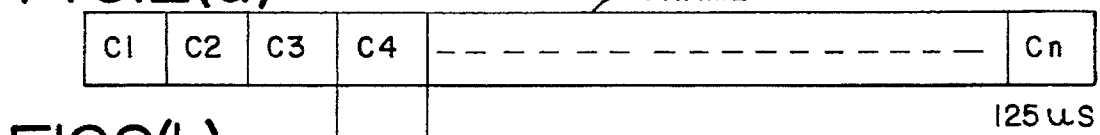
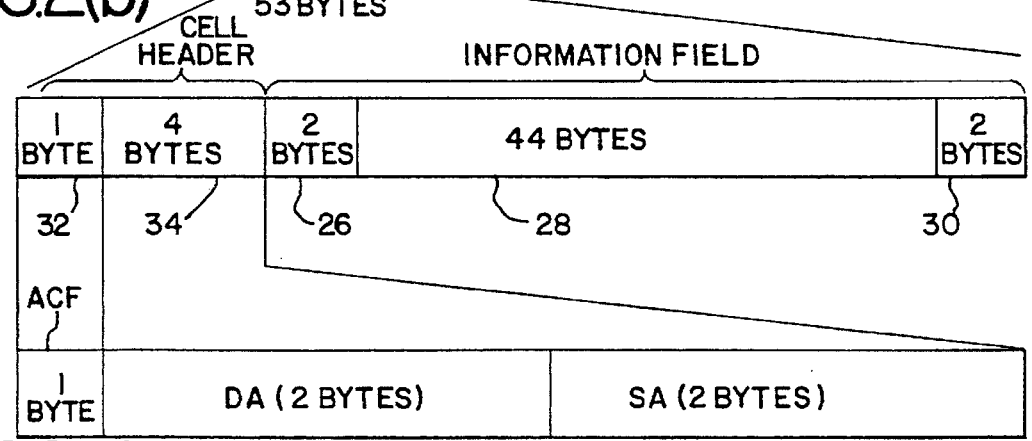
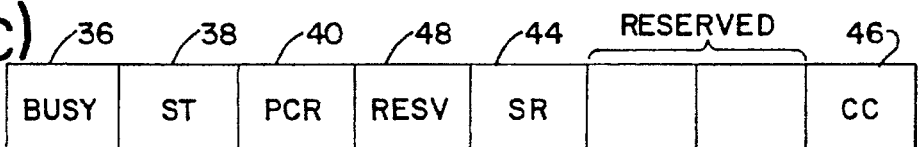
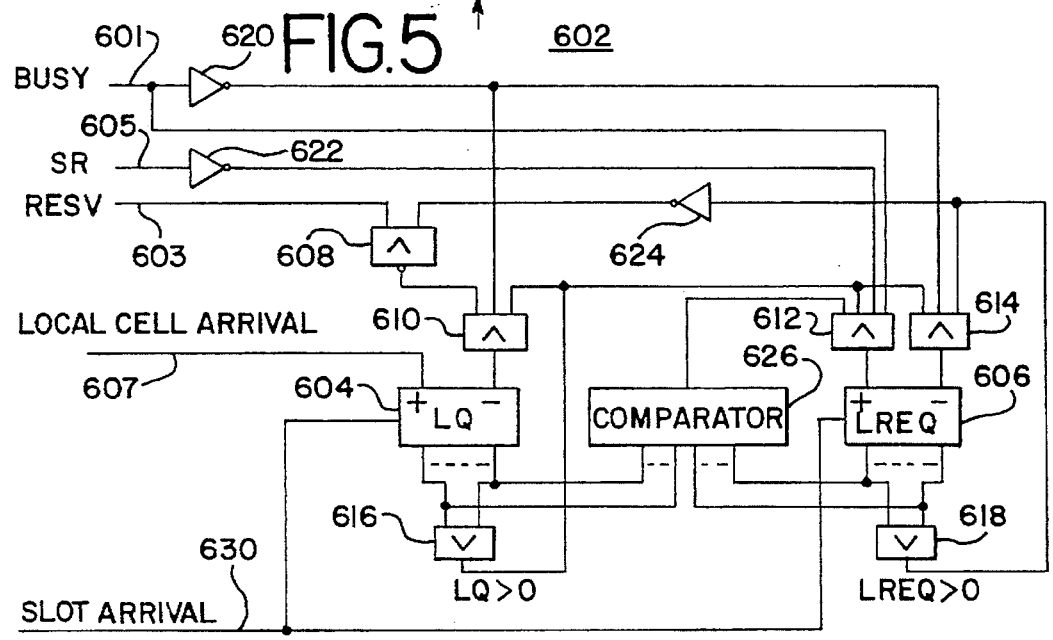

MEDIUM ACCESS CONTROL PROTOCOL FOR SINGLE BUS FAIR ACCESS LOCAL AREA NETWORK

CROSS-REFERENCE TO RELATED APPLICATION

The present invention is a continuation-in-part application based upon prior application Ser. No. 08/029,882 filed Mar. 11, 1993, and entitled "A Medium Access Control (MAC) Protocol for Single Bus Multimedia Fair Access Local Area Network now U.S. Pat. No. 5,402,422."

BACKGROUND OF THE INVENTION

1. Field of the Invention

This invention relates generally to local area networks and more particularly, it relates to a method and apparatus for data transmission utilizing a medium access control (MAC) layer protocol in a slotted unidirectional bus local area network to provide a high efficiency and complete fair cell-access scheme that is independent of the number of network stations connected to the bus.

2. Description of the Prior Art

As is known in the information technology, there exists a number of organizations such as CCITT, TI, IEEE, and ISO that define interfaces, networks, and protocols so that different equipments can communicate with each other. For example, a subnetworking system for use in metropolitan area network (MAN) is the distributed queue dual bus (DQDB) as defined in IEEE 802.6 DQDB Metropolitan Area Networks standard. The DQDB subnetwork consists of two oppositely oriented unidirectional buses and a plurality of stations distributed along the length of the buses. For a more detailed description and as a background, reference is made to an article authored by R. M. Newman, Z. L. Budrikis, and J. L. Hullett entitled "The QPSX Man" in IEEE Communications Magazine, Vol. 26, No. 4, April, 1988, pp. 20–28.

The DQDB subnetwork provides two types of cell transmission services: (1) isochronous cell transmission mode that allows connected stations to establish multiple virtual channels for voice and video transmission services requiring steady bandwidth, and (2) asynchronous cell access mode defined under the concept of Asynchronous Transfer Mode (ATM) to provide a high efficiency and burst information transport. See the article entitled "ATM Ring Protocol and Performance" authored by H. Ohnishi, N. Morita, S. Suzuki of NTT Communication Switching Labs of Tokyo, Japan. The bandwidth not reserved for isochronous cell transmissions is shared among the stations based upon priority and position in a queue which is distributed across the buses, one for each direction. The DQDB has a slotted access protocol which uses a reverse bus to reserve a slot in order to make the access fairer. The fairness problems in DQDB networks and a proposed solution are discussed in a paper by E. L. Hahane, A. K. Choudbury, and N. F. Maxemchuk of AT&T entitled "Improving The Fairness of Distributed-Queue-Dual-Bus Networks" dated September, 1989.

In U.S. Patent No. 4,922,244 to John L. Hullett et al. issued on May 1, 1990, there is disclosed a method of transmitting data on a communication network having two oppositely directed unidirectional buses (A, B) and a number of access units (4) coupled between the buses. The method includes the step of establishing a queue which is distributed in the access units and which controls when the access units can transmit data packets on the buses. When an access unit has a data packet (38) queued for transmission on the bus A, it sends a REQ bit on the bus B. The access units monitor the number of REQ bits passing and the packets available so as to thereby establish the distributed queue.

In U.S. Pat. No. 4,977,557 to Van P. T. Phung et al. issued on Dec. 11, 1990, there is disclosed a method of providing priority access in a communication system having dual unidirectional and oppositely oriented buses. An effectiveness factor K is introduced to enhance the effectiveness of priority. In one embodiment, lower priority countdown counters CD are incremented by K for each higher priority request. In a second embodiment, lower priority request counters RQ are also incremented. In a third embodiment, the low priority countdown counters CD slots are incremented only for the highest request received in a given slot. In a fourth embodiment, the lower priority request counters RQ are also incremented.

U.S. Pat. No. 5,001,707 to R. Kositpaiboon issued on Mar. 19, 1991, teaches a method of providing reserved bandwidth in a communication system having dual unidirectional and oppositely directed buses connected therebetween in which the bandwidth is provided by fixed format cells. The method includes the step of reserving a bandwidth on a data bus in response to requests accepted from stations on a signal bus. Each station is provided with a reserved bandwidth value which is calculated in dependence upon an amount of bandwidth requested by the station. A number of reserved bandwidth cells per a cell generation cycle is generated in dependence upon a total bandwidth requested by the stations. At each station, each reserved bandwidth used is counted until the reserved bandwidth value is reached.

However, none of the prior art discussed above discloses a method and apparatus for data transmission like that of the present invention which utilizes a medium access control (MAC) layer protocol in a multimedia slotted single bus local area network so as to achieve a full bandwidth utilization and a complete fair cell-access scheme that is independent of the number of network stations connected to the bus.

SUMMARY OF THE INVENTION

Accordingly, it is a general object of the present invention to provide an improved method and apparatus for data transmission utilizing a medium access control protocol with a fair cell-access scheme in a multimedia slotted single bus local area network which is relatively simpler in its construction and operation than those traditionally available.

It is an object of the present invention to provide a method and apparatus for data transmission utilizing a medium access control protocol with a fair cell-access scheme in a local area network having a unidirectional looped bus and a plurality of network stations coupled to the bus for asynchronous cell transmission from one network station to other network stations.

It is also an object of the present invention to provide a method and apparatus for data transmission utilizing a medium access control protocol with no bus bandwidth wastage when the network traffic overflows the bus capacity. In other words, every time slot is used for carrying a cell when the network is overloaded by a plurality of network stations coupled to the bus.

It is another object of the present invention to provide a method and apparatus for data transmission utilizing a medium access control protocol with a fair cell-access scheme that is independent of the number of network stations connected to a unidirectional looped bus.

It is another object of the present invention to provide a method and apparatus for data transmission utilizing a medium access control protocol with a prioritized cell-access scheme that embodies multiple classes of cell deliveries from one network station to other network stations.

It is still another object of the present invention to provide a method and apparatus for data transmission in a multimedia slotted single bus local area network which includes a medium access control layer protocol for producing a complete fair cell-access scheme which can be implemented at a relatively low cost.

In accordance with these aims and objectives, the present invention is concerned with the provision of a method and apparatus for data transmission utilizing a medium access control protocol with a fair prioritized cell-access scheme in a local area network having a unidirectional looped bus and a plurality of network stations coupled to the bus for asynchronous cell transmission from one network station to other network stations. A head-of-bus is used to generate continuously time slots to the bus. Each of the time slots includes a busy bit, two slot reserved bits, and two slot reservation bits. Each of the plurality of network stations provides priority cells to be transported in the time slots.

A priority cell is delivered to a current time slot by one of the plurality of network stations when neither the busy bit nor the reserved bits are set and it subsequently sets the busy bit. One of the slot reservation bits is set to reserve a future time slot by the one of the plurality of network stations from the head-of-bus when the busy bit is set and the regarding slot reservation bit is not set. The corresponding slot reserved bit in the next outgoing slot is set by the head-of-bus when a slot with one of the slot reservation bits set is received. A cell is delivered to a current time slot by the one of the plurality of network stations that had previously set the slot reservation bit when the busy bit is not set and the slot reserved bit is set in the current time slot.

The foregoing applies specifically to the disclosure of the parent application Ser. No. 08/029,882. A second embodiment of the present invention added by way of this continuation-in-part application is shown in FIGS. 6-8 of the drawings. This added embodiment represents significant improvements over the embodiment of FIGS. 1-5 so as to produce a method and apparatus for data transmission utilizing a medium access control layer protocol in a slotted unidirectional bus local area network to provide a fair cell-access scheme having a two-level priority for access.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a schematic representation of a unidirectional looped bus transmission system, constructed in accordance with the principles of the present invention;

FIG. 2(a)-2(c) show the timing frame structure and the arrangement for the cell in accordance with the present invention;

FIG. 3 is a MAC bitmap, illustrating the first five (5) bits in the first byte of each cell;

FIG. 5 is a logic block diagram of a slot reservation mechanism operated in accordance with the MAC protocol of FIG. 4;

DESCRIPTION OF THE PREFERRED EMBODIMENT

Figure 4:
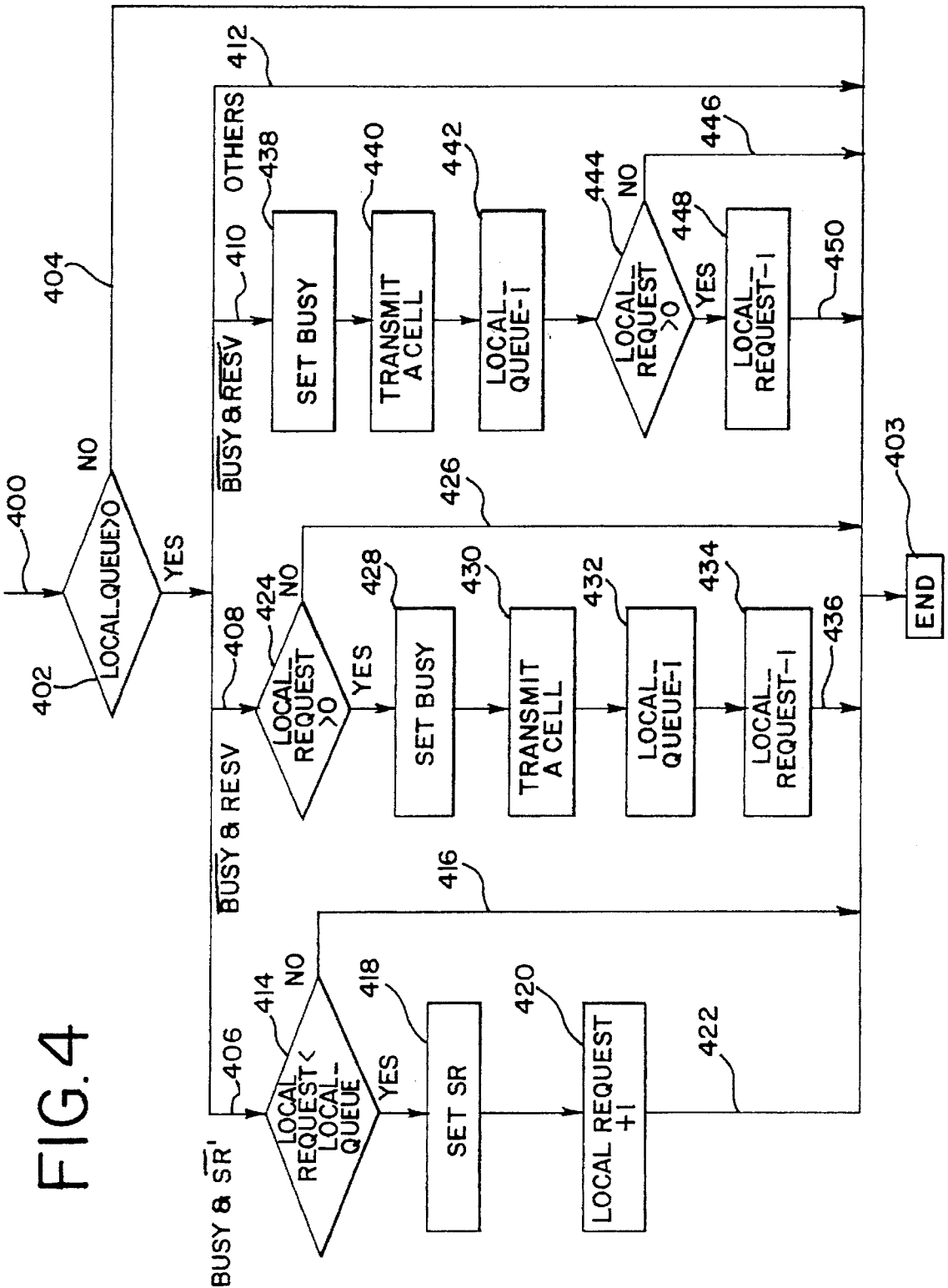
FIG. 4 is a flow chart diagram of the medium access control (MAC) protocol for non-prioritized cell access of the bus by the network stations connected thereto.

Referring now in detail to the drawings, there is shown in FIG. 1 a schematic representation of a unidirectional looped bus transmission system 10 for data transmission which is constructed in accordance with the principles of the present invention. The transmission system 10 comprises a unidirectional looped bus 12, a head-of-bus (HOB) 14, and a plurality of network stations 16a, 16b, 16c, ... 16n. The bus 12 originates at terminal 18 of the HOB 14 and terminates at terminal 20 of HOB 14. The plurality of network stations are distributed along the bus 12, each of the network stations 16a through 16n having a read access line 22 connected to the bus 12 and a write (transmit) line 24 connected to the bus 12. The HOB 14 generates time slots continuously to the bus 12. These time slots effectively segment the bus capacity into pieces which are then made available to the network station 16a through 16n for providing access to the bus 12.

For network synchronization, the HOB generates time frames which are 125 uS in length. Each of the 125 uS frames are divided into fixed length time slots which can be filled with information so as to carry cells or segments of basic information units travelling along the bus. Thus, each cell C1, C2, ... Cn has a fixed length of 53-bytes (8 bits or an octet) with a header of 5-bytes and an information field of 48-bytes. The information field is further divided into a 2-byte header 26, a 44-byte data 28, a 2-byte trailer 30. The timing structure and arrangement of the cell is illustrated diagrammatically in FIGS. 2(a)-2(c).

The present invention is concerned with the first five bits of the first byte 32 which is also sometimes referred to as a MAC bitmap or access control field (ACF). As shown in FIG. 3, the MAC bitmap includes a BUSY bit 36, a ST bit 38, a PSR bit 40, a RESV bit 42, and a SR bit 44. The remaining three bits are reserved for future expansion. The BUSY bit 36, the ST bit 38, and the PSR bit 40 are used in the same way as defined in the IEEE 802.6 DQDB standard. In particular, the BUSY bit 36 is used to indicate the status of the slot, i.e., whether a cell is being carried or not. The ST bit 38 is used to indicate the slot type, which is being issued, either asynchronous or isochronous.

The HOB provides two types of slots: (1) the pre-arbitrated (PA) isochronous slot, and (2) asynchronous slot. The PA slot types are dedicated to isochronous services which represent prearranged bandwidth and are only available for use by the network station for which they were generated. The PA slot types carry a virtual channel identifier which is recognized by the network station allowed to make use of the slot. The PA slot types occupy a portion of the total capacity of the bus. The remaining capacity is provided by the asynchronous slot types. On the other hand, the asynchronous slot types are for asynchronous services shared among the network stations along the bus. This sharing is achieved by the MAC protocol of the present invention which produces a complete fair cell-access scheme that is independent of the number of network stations connected to the bus.

The HOB sets the BUSY bit 36 to a logic "1" and the ST bit 38 to a logic "1" so as to designate a PA slot type. In order to indicate an asynchronous slot type, the HOB sets the BUSY bit 36 to a logic "0" and the ST bit 38 to a logic "0." The PSR bit 40 is called a previous segment received bit which is used by a destination network station to mark the reception of a cell delivered to it in a previous slot. In other words, after a cell has been received by the destination network station, the station will set the PSR bit 40 to a logic "1" in the next immediate slot.

The improved MAC layer protocol of the present invention essentially uses the RESV bit 42 and the SR bit 44 to perform cell access. The SR bit 44 is called a slot reservation bit which is used by the network station to reserve a future slot from the HOB 14. The RESV bit 42 is called a slot reserved bit which is used by the HOB 14 to respond to a slot reservation request sent from a local network station, i.e., 16a through 16n. The cell access scheme of this new MAC protocol for asynchronous cell transmission can be best understood by reference to the flow chart of FIG. 4.

The flow chart of FIG. 4 represents the new MAC protocol for non-prioritized cell access on the bus 12 by each of the network stations 16a, . . . 16n connected thereto as shown in FIG. 1. The HOB 14 generates the time slots on the bus 12 for transporting of cells from upstream network stations to downstream network stations, the station 16a being the first station and the station 16n being the Nth station on the bus. The network station 16b and 16c represent intervening stations along the bus. For upstream-to-downstream transmission, only one slot is used to transport a cell from a source station to a destination station. However, for downstream-to-upstream transmission, two slots are used to complete a cell delivery. The cell is first transported to the HOB 14 from a source station (i.e., 16c) in a first slot. Thereafter, the second slot is used to carry the cell from the HOB 14 to a destination station (i.e., 16a). In this case, the HOB 14 must perform a cell relay function as well be described hereinafter.

Two up-down counters, LOCAL-REQUEST counter 420 and LOCAL-QUEUE counter 432 are used in each network station to control the cell access through the bus 12.

When a local network station has cells to be transported, it begins with a block 402 to determine whether the number of local queued cells to be transported is greater than zero. If the answer is no, nothing further is done and the end block 403 is reached via line 404. It should be understood that a local cell arrival signal indicative of the number of local queued cells are loaded into the block 402 via line 400 which is determined typically from an upper layer.

If the answer is yes, one of the following paths on either the line 406, 408, 410 or 412 will be taken dependent upon the logic condition of BUSY, RESV, and SR bits in the current slot. For a first condition, if the BUSY bit 36 is set to a logic "1" and the SR bit 44 is at a logic "0," a block 414 is reached via the line 406 in which it is determined whether the number of unsatisfied slot reservations (local requests) is less than the number of local queued cells (untransmitted cells). If the answer is no, nothing further is done and the end block 403 is reached via line 416. If the answer is yes, the network station sets the SR bit 44 to a logic "1" in a block 418 in order to reserve a future slot from the HOB 14. Upon receiving a slot with the SR bit 44 set to a logic "1," the HOB 14 will set the RESV bit 42 to a logic "1" in the next outgoing slot for asynchronous cell transmission. Then, the number of unsatisfied slot reservations (local requests) is increased by one in a block 420. From the block 420, the end block 403 is reached by the line 422.

For a second condition, if the BUSY bit 36 is not set and the RESV bit 42 is set to a logic "1," a block 424 is reached via the line 408 in which it is determined whether the number of unsatisfied slot reservations (local requests) is greater than zero. If the answer is no, the end block 403 is again reached via the line 426. If the answer is yes, the local network station that had made a slot reservation sets the BUSY bit 36 to a logic "1" in a block 428. Then, the network station uses the current slot to transmit a queued cell in a block 430. Next, the number of local queued cells is decreased by one in a block 432. Further, the number of unsatisfied slot reservations is also decreased by one in a block 434. From the block 434, the end block 403 is reached via line 436.

For a third condition, if neither the BUSY bit 36 nor the RESV bit 42 are set to a logic "1" a block 438 is reached via the line 410 in which the BUSY bit 36 is set to a logic "1" by the network station. Then, the network station uses the current slot to transmit a queued cell in a block 440. Next, the number of local queued cells is decreased by one in a block 442. From the block 442, a block 444 is reached in which it is determined whether the number of unsatisfied slot reservations is greater than zero. If the answer is no, the end block 403 is reached via line 446. If the answer is yes, the number of unsatisfied slot reservations is decreased by one in a block 448 followed by the end block 403 via line 450.

In all other conditions of the BUSY, RESV, and SR bits, no action is taken and the slot is allowed to pass by the network station. In other words, the end block 403 is reached by the line 412.

In FIG. 5, there is shown in block diagram form a slot reservation mechanism 602 which is located at each network station and which has been implemented to operate in accordance with the new MAC protocol of FIG. 4. The slot reservation mechanism 602 includes a local queue counter 604 which is used to keep track of the number of untransmitted cells and a local slot request counter 606 which is used to keep track of the number of unsatisfied slot reservations. The counters 604 and 606 are up-down counters which are responsive to the BUSY, RESV and SR bits upon respective lines 601, 603, and 605 received in the cell header and the slot arrival signal 630. The local cell arrival signal 607 indicates a cell transferred from the upper layer (i.e., LLC-Logical Link Control) to the MAC layer. The slot reservation mechanism 602 further includes a NAND logic gate 608; AND logic gates 610, 612 and 614; OR logic gates 616 and 618; inverters 620, 622 and 624; and the comparator 626.

Since the present transmission system 10 is a slotted system that adapts the looped bus architecture, the HOB 14 includes a slot generator for continuously issuing new time slot streams to the bus 12. The slot generator preferably generates 8,000 time frames per second so as to be compatible with existing telephone communication hierarchy in digital signal transmissions. Accordingly, all time slots are carried in 125-microsecond frame periods. Under this condition, smooth channels required by voice and video transmissions can be easily established for isochronous cell transmissions.

The HOB 14 also performs the function of cell relay control, as previously mentioned, so as to determine whether to issue slots carrying the incoming cells (undelivered) from the bus 12 or to provide empty slots to the bus 12. There are two cell transport protocols which are considered necessary: (1) point-to-point cell delivery, and (2) cell broadcast.

In the point-to-point cell transport, an upstream-to-downstream cell transport is defined in a unidirectional bus system to be when a cell is to be delivered from a first network station located closer to the HOB 14 to a second network station located further away from the HOB 14 along the direction of signal transmission. In this case, the cell transport ends at the HOB 14. Thus, the HOB 14 simply discards the received incoming cell by issuing an empty slot to the bus. On the other hand, in a downstream-to-upstream cell transport where a cell delivery is from a first network station located further away from the HOB 14 to a second network station located closer to the HOB 14 along the direction of signal transmission, the HOB needs to relay the cell because the source station is located downstream of the destination station. Therefore, two slots must be allocated to complete a cell transport. A first one is used to deliver the cell from a downstream source station to the HOB 14, and a second one is used to deliver the cell from the HOB 14 to the upstream destination station.

In cell broadcast including multicast, this is achieved by cell retransmissions at the HOB 14. As used herein, the term "broadcast" means that all of the other stations connected to the bus 12 are the recipients of a particular cell, and the term "multicast" means that a group of stations are the recipient of a particular cell. In a cell broadcast, there is usually involved two steps consisting of (1) a source station sending a cell to the HOB 14 via the point-to-point cell transport, and (2) the HOB 14 retransmitting the incoming cell to the bus with a special virtual channel identification which is recognized by all of the local network stations. Consequently, two slots are required to complete a cell broadcast as is needed in the downstream-to-upstream cell transport.

In order for the HOB 14 to determine what action must be undertaken upon receiving an incoming cell, the HOB 14 holds the incoming cell in a cell buffer for one time slot. The HOB 14 uses the one-slot delay for determining whether the incoming cell is to be discarded or the incoming cell is to be relayed to the bus. This is achieved by the HOB 14 through the use of SR bit 44, the RESV bit 42 and the PCR bit 40. In operation, upon receiving an incoming cell with the SR bit 44 set to a logic "1" on the bus, the HOB 14 responds by setting the RESV bit 42 to logic "1" on the outgoing slot so as to indicate such slot is being reserved for a network station that requested a slot reservation earlier. When a destination station receives a cell in a carrying slot, it sets the PCR bit 40 in the next immediate slot to a logic "1" so as to indicate the cell reception.

The HOB 14 uses the PCR bit 40 to determine whether the previous incoming cell should be discarded or relayed to the bus. This is the reason for the one-slot delay. Specifically, if the PCR bit 40 was set to a logic "1" in the current incoming cell, this means that the cell carried by the previous slot (which is now in the cell buffer) was destinated and thus must be discarded. Otherwise, if the PCR bit 40 is not set, then the current incoming cell must be retransmitted through the bus.

Under normal circumstances, the retransmitted cell is only circulated once around the bus since such cell is received by its destination station. However, in the case of a malfunction at such destination station which prevents it from correctly receiving a destinated cell, an undelivered cell will continue to be retransmitted again and again around the bus indefinitely, thereby causing a reduction in the bandwidth of the bus. In order to solve this cell circulation problem, one of the three reserved bits in the MAC bit map is used, which is defined to be a CC (cell circulation) bit 46 in conjunction with the PCR bit 40. This is also illustrated in the MAC bitmap of FIG. 3.

In use, the HOB 14 will always send a new time slot with the CC bit 46 cleared or set to a logic "0." However, when the HOB 14 is required to retransmit an incoming cell back to the bus, it will also set the CC bit 46 to a logic "1." Accordingly, if the HOB 14 receives a current incoming cell with the CC bit 46 set to the logic "1" and also receives an immediate following cell with the PCR bit 40 at the logic "0," this indicates that an undesired cell delivery error which means that some destination station could not correctly receive a designated cell. As a result, the HOB 14 will simply discard the received incoming cell and will send instead an empty slot to the bus 12. Meanwhile, the HOB 14 will report this error to the network management function residing at an upper layer.

It should be apparent to those skilled in the art that every time slot can be captured for transporting a cell in view of the slot reservation mechanism of FIG. 5 which is operated in accordance with the new MAC protocol of FIG. 4. Therefore, if all of the traffic on the bus 12 consists of only upstream-to-downstream cell deliveries, the throughput of the transmission system 10 can reach 100% of the bus capacity. On the other hand, if all of the traffic on the bus consists of downstream-to-upstream cell deliveries, the throughput of the transmission system 10 is 50% of the bus capacity since two time slots must be allocated for the same cell delivery as previously discussed. Under a uniformly distributed (or 50—50) upstream-to-downstream and downstream-to-upstream cell delivery traffic pattern, the throughput of the transmission system 10 reaches 67% of the bus 12 capacity.

In order to increase the throughput of the transmission system, a certain number of the local network stations connected to the bus 12 may be provided with a slot erasing function so as to generate reusable slots after reception of a cell. Preferably, network stations with a slot erasing function should be distributed along the bus so as to increase the slot reusability. Moreover, in order to provide higher bandwidth and network efficiency to the users, a second unidirectional bus oppositely directed to the first unidirectional bus could be provided and the network stations would be coupled to the second bus in reverse order. In this case, a second head-of-bus is required since its output terminal is connected to the Nth station. Thus, there would only be upstream-to-downstream cell deliveries when two buses are provided.

While the main cell access scheme of the present MAC protocol is for asynchronous cell transmission, it should be clearly understood that multiple virtual circuits can be concurrently established at any local network station for synchronous cell transmission so as to support smooth channel capability for voice and video delivery. The transmission medium of the network can be either an electrical line (twisted pair and coaxial cable) or an optical fiber. The network station transmission rate varies depending upon the particular medium which is employed. In the case of electrical transmissions, the network has a performance superior to Ethernet and Token Ring network with comparable or lower implementation costs. On the other hand, if the transmission medium is optical, the present network assures Broadband Integrated Services Digital Network (B-ISDN) connectivity of the Consultative Committee for International Telegraph and Telephone (CCITT) at rates of 155.52 Mbps, 622.08 Mbps, or higher.

For purposes of illustration, there is shown in the Table below a simulation result showing the timing sequence of the new MAC protocol for non-prioritized cell access of the bus by the network stations. For simplicity, there are shown only three network stations connected to nodes 1, 2 and 3 respectively. It is assumed that all network stations and the head-of-bus are equally distributed at a distance of one time slot. Further, all stations are assumed to always have a cell to transmit (each station attempting to hog the entire bus bandwidth). Only asynchronous cell transmissions are involved, and all cells from the network stations are assumed to be terminated at the HOB 14. The network is further assumed to be completely unloaded initially and that all network stations are turned on simultaneously.

TABLE

| Slot | HOB (Rec Send) (B, S, R) | NODE_1 (Rec., Send) (B, R, S, B, S) | NODE_2 (Rec., Send) (B, R, S, B, S) | NODE_3 (Rec., Send) (B, R, S, B, S) |
|---|---|---|---|---|
| 0  | - - -   | - - - 1 - | - - - 1 -   | - - - 1 -   |
| 1  | - - -   | - - - 1 - | * - - - 1   | * - - - 1   |
| 2  | 1 - -   | - - - 1 - | * - - - 1   | * - * - -   |
| 3  | 1 * 1   | - - - 1 - | * - - - 1   | * - * - -   |
| 4  | 1 * 1   | - * - - - | * - - - 1   | * - * - -   |
| 5  | 1 * 1   | - * - - - | - * - 1 -   | * - * - -   |
| 6  | 1 * 1   | - * - - - | - * - 1 -   | * * - - 1   |
| 7  | 1 * 1   | - * - - - | - * - 1 -   | * * - - 1   |
| 8  | 1 * 1   | - * - - - | - * - 1 -   | * * - - 1   |
| 9  | 1 * 1   | - * - - - | - * - - -   | * * - - 1   |
| 10 | 1 * 1   | - * - - - | - * - - -   | - * - 1 -   |
| 11 | 1 * 1   | - * - - - | - * - - -   | - * - 1 -   |
| 12 | 1 - -   | - * - - - | - * - - -   | - * - 1 -   |
| 13 | 1 - -   | - - - 1 - | - * - - -   | - * - 1 -   |
| 14 | 1 - -   | - - - 1 - | * - - - 1   | - * - 1 -   |
| 15 | 1 - -   | - - - 1 - | * - - - 1   | * - * - -   |
| 16 | 1 - -   | - - - 1 - | * - - - 1   | * - * - -   |
| 17 | 1 * 1   | - - - 1 - | * - - - 1   | * - * - -   |
| 18 | 1 * 1   | - * - - - | * - - - 1   | * - * - -   |
| 19 | 1 * 1   | - * - - - | - * - 1 -   | * - * - -   |
| 20 | 1 * 1   | - * - - - | - * - 1 -   | * * - - 1   |
| 21 | 1 * 1   | - * - - - | - * - 1 -   | * * - - 1   |
| 22 | 1 * 1   | - * - - - | - * - 1 -   | * * - - 1   |
| 23 | 1 * 1   | - * - - - | - * - 1 -   | * * - - 1   |
| 24 | 1 * 1   | - * - - - | - * - 1 -   | * * - - 1   |
| 25 | 1 * 1   | - * - - - | - * - - -   | - * - 1 -   |
| 26 | 1 * 1   | - * - - - | - * - - -   | - * - 1 -   |

Rec — Received
B — Busy Bit
S — SR bit
R — RESV bit

A new MAC protocol of the present invention has the following advantages over the prior art:

(1) It assures a stable and predictable cell access performance regardless of the variations of the network traffic conditions;

(2) It provides a complete fair cell-access scheme which is independent of the number of network stations connected thereto;

(3) It assures a fair bandwidth share by each network station irrespective of its physical location with respect to the head-of-bus;

(4) It provides a cell access scheme in which every time slot can be used for cell transport when the network overloads; and (5) It has a relatively low implementation cost.

From the foregoing detailed description, it can thus be seen that the present invention provides an improved method and apparatus for data transmission utilizing a medium access control protocol with a fair cell-access scheme in a local area network having a unidirectional looped bus and a plurality of network stations coupled to the bus for asynchronous cell transmission from one network station to other network stations. The medium access control protocol achieves a fair bandwidth sharing by using a busy bit, a reserved bit, and a slot reservation bit in each of the time slots generated by a head-of-bus.

In the invention as heretofore shown and described, the MAC protocol of FIG. 4 provides for non-prioritized cell access of the bus 12 by each of the network stations 16a, . . . 16n connected thereto as shown in FIG. 1.

In many cases, it is the case that some cells must be delivered with high priority. Therefore, the invention of prioritized cell access is further made for satisfying urgent cell deliveries.

Figure 6:
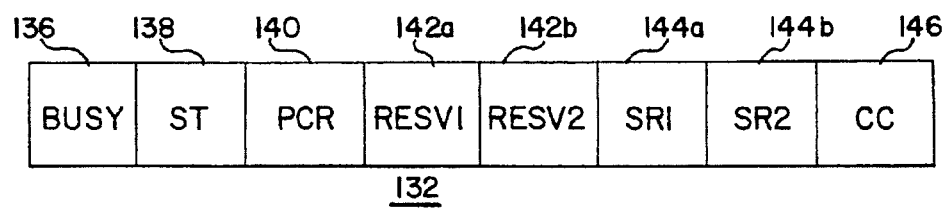
FIGS. 6 and 6A are MAC bitmaps for a two-level, and n-level prioritized cell-access.

In FIG. 6, there is shown a second embodiment of a MAC bitmap for a two-level prioritized cell access which contains all eight bits of the first byte 132. The MAC bitmap includes a BUSY bit 136, a ST bit 138, a PSR bit 140, a RESV1 bit 142a, a RESV2 bit 142b, a SR1 bit 144a, a SR2 bit 144b, and a CC bit 146. By comparing the bitmap of FIG. 6 with the bitmap of FIG. 3, it will be noted that the two bits reserved for future expansion in FIG. 3 have been used in FIG. 6. The BUSY bit 136, the ST bit 138, the PCR bit 140, and the CC bit 146 are used in the same way as previously described in connection with FIG. 3.

The improved MAC layer protocol of the second embodiment essentially uses the RESV1 bit 142a, the RESV2 bit 142b, the SR1 bit 144a, and the SR2 bit 144b to perform the two-level prioritized cell access. The SR1 bit 144a is called a high priority slot reservation bit which is used by the network stations to reserve a future high priority slot from the HOB 14 (FIG. 1). The SR2 bit 144b is called a low priority slot reservation bit which is used by the network stations to reserve a future low priority slot from the HOB 14. The RESV1 bit 142a is a high priority reserved bit which is used by the HOB to respond to a high priority slot reservation request sent from a local network station, i.e., 16a through 16n. The RESV2 bit 142b is called a low priority reserved bit which is used by the HOB 14 to respond to a low priority slot reservation request sent from the local network station. The two-level prioritized cell access scheme of this new MAC protocol of the second embodiment for asynchronous cell transmission can be best understood by reference to the flow chart of FIG. 7.

Figure 8:
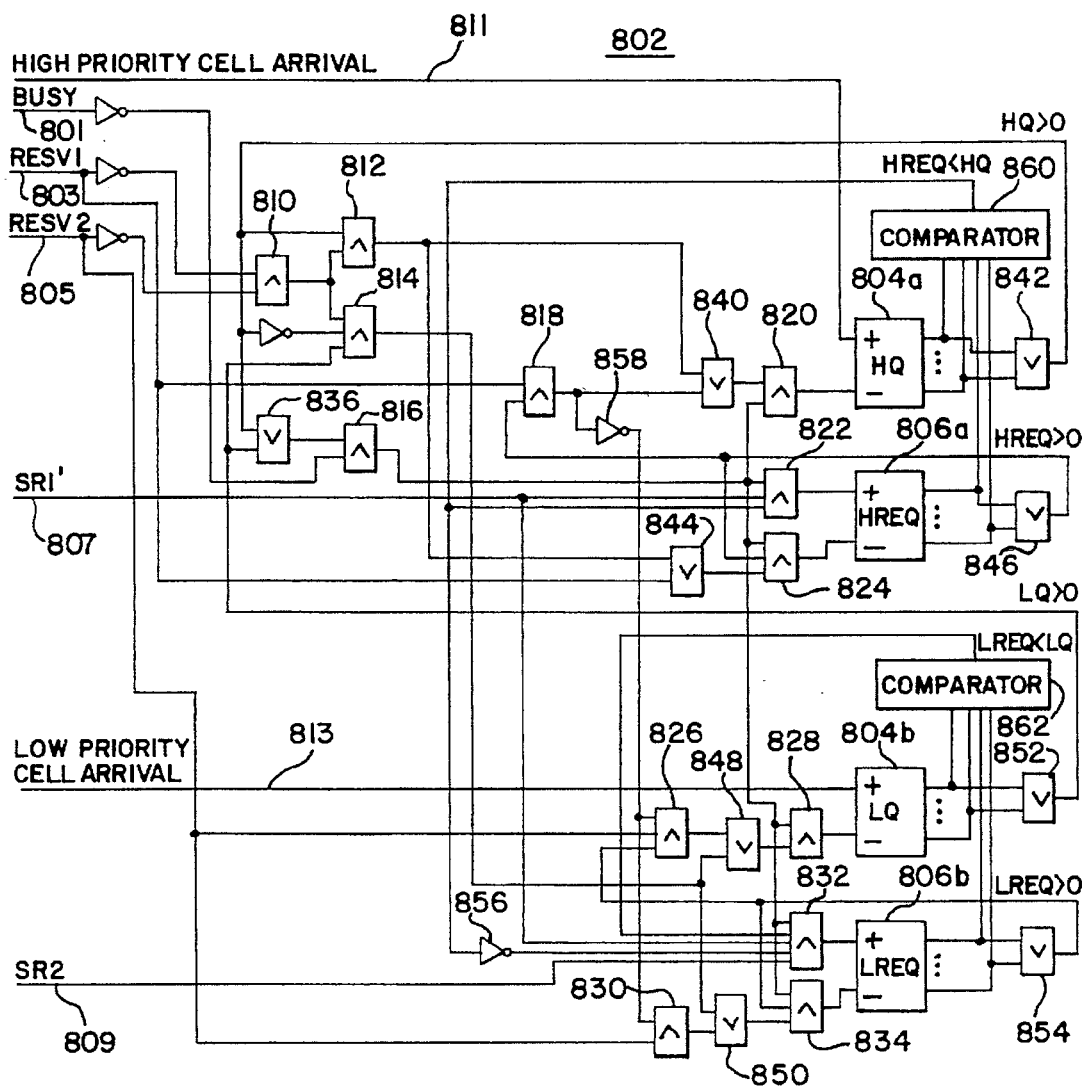
FIG. 8 is a logic block diagram of a slot reservation mechanism operated in accordance with the MAC protocol of FIG. 7.
Figure 7:
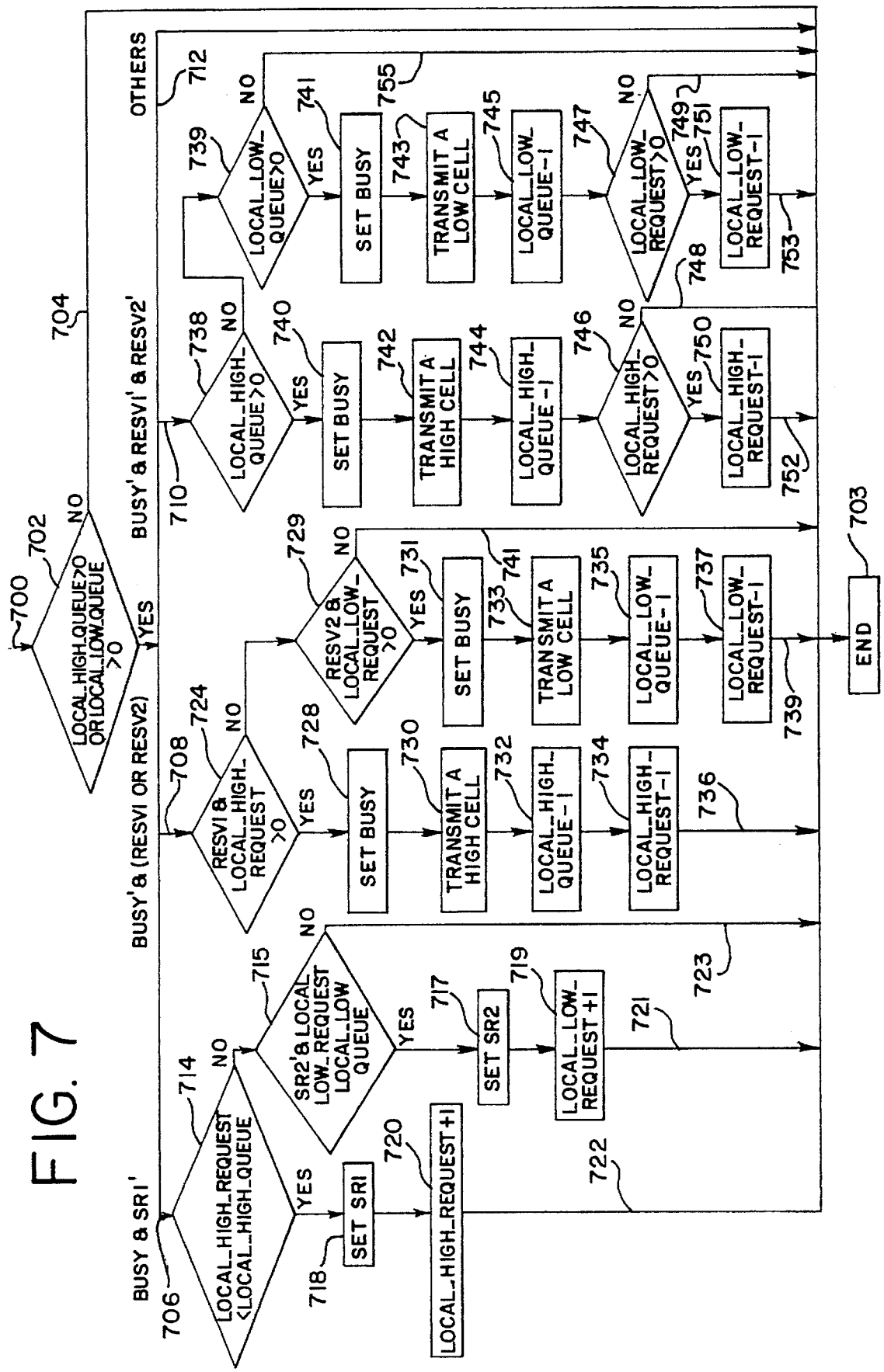
FIG. 7 is a flow chart diagram of the medium access control (MAC) protocol for a two-level prioritized cell access of the bus by the network stations connected thereto.

The flow chart of FIG. 7 represents the new MAC protocol for the two-level prioritized cell access of the bus 12 by each of the network stations 16a, . . . 16n connected thereto as shown in FIG. 1. For each time cycle corresponding to a time slot, each network station begins with block 702 to determine whether it has either high priority or low priority cells to be transported. Two counters, high priority local queue counter 804a and low priority local queue counter 804b as shown in FIG. 8 are used for this testing. When a local network station has either high priority cells or low priority cells to be transported, that is, the number of local queued high priority cells to be transported is greater than zero or the number of local queued low priority cells to be transmitted is greater than zero. The local network station will take certain actions by choosing one of the paths as described below to continue the flow chart movement. If the answer is no, nothing further is done and the end block 703 is reached via line 704. It should be understood that a local high priority cell arrival signal indicative of the number of local queued high priority cells and a local low priority cell arrival signal indicative of the number of local queued low priority cells are loaded into the counter 804a and the counter 804b via lines 811 and 813, which are determined typically from an upper layer.

If the answer is yes, one of the following paths on either the line 706, 708, 710 or 712 will be taken dependent upon the logic condition of BUSY, RESV1, RESV2, SR1, and SR2 bits in the current slot. For a first condition, if the BUSY bit 136 is set to a logic "1" and the SR1 bit 144a is at a logic "φ," a block 714 is reached via the line 706 in which it is determined whether the number of unsatisfied high priority slot reservations (local high priority request) is less than the number of local queued high priority cells (the number of high priority cells that arrived but have not been transmitted). If the answer is yes, the network station sets the SR1 bit 144a to a logic "1" in a block 718 in order to reserve a future high priority slot from the HOB 14. Upon receiving a slot with the SR1 bit 144a set to a logic "1," the HOB 14 will set the RESV1 bit 142a to a logic "1" in the next outgoing slot for asynchronous transmission. Then, the number of unsatisfied high priority slot reservations (local high priority requests) is increased by one in the block 720. From the block 720, the end block 703 is reached by the line 722.

On the other hand, if the answer from the block 714 is no, a block 715 is reached in which it is determine whether the number of unsatisfied low priority slot reservations (local low priority requests) is less than the number of local queued low priority cells (the number of low priority cells that arrived but have not been transmitted). This is done provided that the SR2 bit 144b is at a logic "φ." If the answer from the block 715 is yes, the network station sets the SR2 bit 144b to a logic "1" in a block 717 in order to reserve a future low priority slot from the HOB 14. Upon receiving a slot with the SR2 bit 144b set to a logic "1," the HOB 14 will set the RESV2 bit 142b to a logic "1" in the next outgoing slot for asynchronous transmission. Then, the number of unsatisfied low priority slot reservations (local low priority requests) is increased by one in a block 719. From the block 719, the end block 703 is reached by a line 721. However, if the answer from the block 715 is no, nothing further is done and the end block 703 is reached via line 723.

For a second condition, if the BUSY bit 136 is not set and the RESV1 bit 142a or RESV2 bit 142b is set to a logic "1," a block 724 is reached via the line 708 in which it is determined whether the number of unsatisfied high priority slot reservations (local high priority requests) is greater than zero. If the answer is yes, the local network station that had made a high priority slot reservation sets the BUSY bit 136 to a logic "1" in a block 728. Then, the network station transmits a high priority cell in a block 430. Next, the number of local queued high priority cells is decreased by one in a block 732. Further, the number of unsatisfied high priority slot reservations is also decreased by one in a block 734. From the block 734, the end block 703 is reached via line 736.

On the other hand, if the answer from the block 724 is no, a block 729 is reached in which it is determined whether the number of unsatisfied low priority slot reservations (local low priority requests) is greater than zero. This is done provided the RESV2 bit 142b is at a logic "1." If the answer from the block 729 is yes, the local network station that had made a low priority slot reservation sets the BUSY bit 136 to a logic "1" in a block 731. Then, the network station transmits a low priority cell in a block 733. Next, the number of local queued low priority cells is decreased by one in a block 735. Further, the number of unsatisfied low priority slot reservations is also decreased by one in a block 737. From the block 737, the end block 703 is reached via line 739. However, if the answer from the block 729 is no, nothing further is done and the end block 703 is reached via line 741.

For a third condition if neither the BUSY bit 136, the RESV1 bit 142a, nor the RESV2 bit 142b is set to a logic "1" a block 738 is reached via line 710 in which it is determined whether the number of local queued high priority cells is greater than zero. If the answer is yes, a block 740 is reached in which the BUSY bit 136 is set to a logic "1" by the network station. Then, the network station transmits a high priority cell in a block 742. Next, the number of local queued high priority cells is decreased by one in a block 744. From the block 744, a block 746 is reached in which it is determined whether the number of unsatisfied high priority slot reservations is greater than zero. If the answer is no, the end block 703 is reached via line 748. If the answer is yes, the number of unsatisfied high priority slot reservations is decreased by one in a block 750 followed by the end block 703 via line 752.

On the other hand, if the answer from the block 738 is no, a block 739 is reached in which it is determined whether the number of local queued low priority cells is greater than zero. If the answer from the block 739 is yes, a block 741 is reached in which the BUSY bit 136 is set to a logic "1" by the network station. Then, the network station transmits a low priority cell in a block 743. Next, the number of local queued low priority cells is decreased by one in a block 745. From the block 745, a block 747 is reached in which it is determined whether the number of unsatisfied low priority slot reservations is greater than zero. If the answer is no, the end block 703 is reached via block 749. If the answer is yes, the number of unsatisfied low priority slot reservations is decreased by one in a block 751 followed by the end block 403 via line 753. However, if the answer from the block 739 is no, nothing further is done and the end block 703 is reached via the line 755.

In all other conditions of the BUSY, RESV1, RESV2, SR1, and SR2 bits, no action is taken and the slot is allowed to pass by the network station. In other words, the end block 703 is reached by the line 712.

Figure 6A:
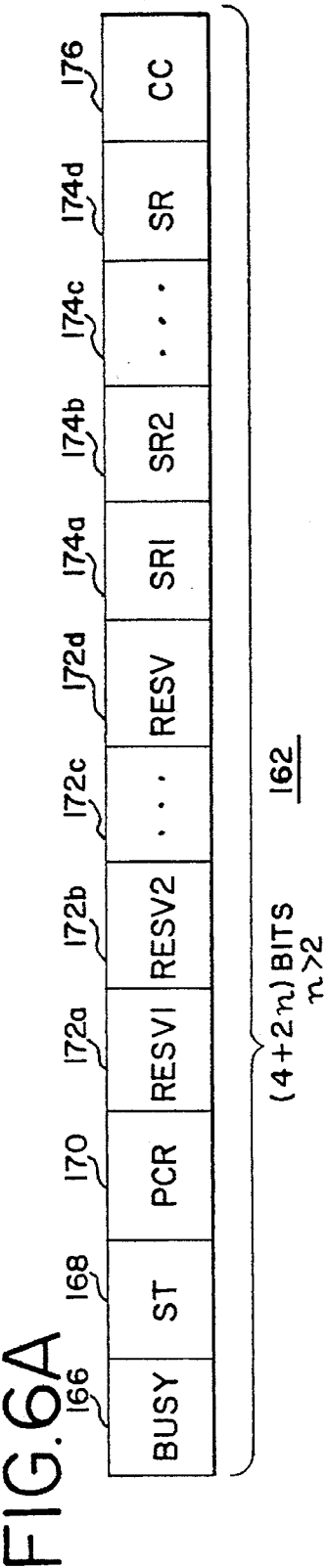

FIG. 6a extends the two-level embodiment of FIG. 6 to n-levels. Instead of two-levels in eight bits, the priority scheme can be increased to n-levels in (4+2n) bits. The concepts and implementation for n-levels is as illustrated in FIGS. 6, 7 and 8 for two levels. All that is necessary is to add additional logic for the extra conditions and levels.

In FIG. 8, there is shown in the block diagram form a slot reservation mechanism 802 which is located at each network station and which has been implemented to operate in accordance with the new MAC protocol of FIG. 7. The slot reservation mechanism 802 includes a local high priority queue counter 804a which is used to keep track of the number of untransmitted high priority cells and a local high priority slot request counter 806a which is used to keep track of the number of unsatisfied high priority slot reservations. Further, the slot reservation mechanism includes a local low priority queue counter 840b which is used to keep track of the number of untransmitted low priority cells and a local low priority slot request counter 806b which is used to keep track of the number of unsatisfied low priority slot reservations.

The two pairs of counters 804a, 806a and 804b, 806b are up-down counters which are responsive to the BUSY, RESV1, RESV2, SR1, and SR2 bits upon respective lines 801, 803, 805, 807, and 809 received in the cell header. These counters are also responsive to a local high priority cell arrival signal 811 and a low priority cell arrival signal 813. The slot reservation mechanism 802 further includes the AND logic gates 810–834; the OR logic gates 836–854; the inverters 856 and 858; and the comparators 860 and 862.

Figure 9:
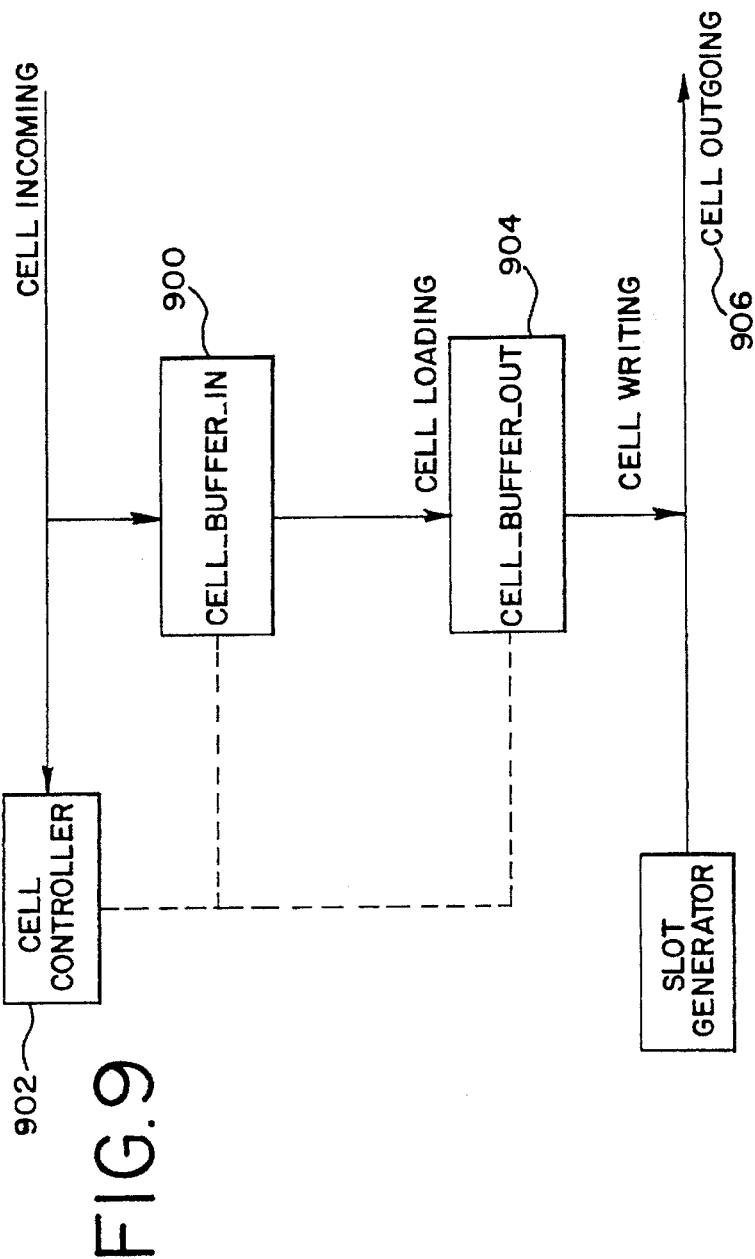
FIG. 9 is a head-of-bus cell control diagram.

Referring to FIG. 9, there is illustrated the structure of the head-of-bus (HOB) cell control. The HOB 14 performs two functions; slot generation and cell relay. According to the status contained in an incoming slot, the HOB 14 transmits either an empty slot or a slot filled with an undelivered cell.

Due to the employment of a unidirectional looped bus, it is obvious that a cell being transmitted from an upstream station to a downstream station requires only one slot for delivery. However, a cell being transported from downstream to upstream stations involves two slots: the first one moves a cell from a source station to the HOB 14, the second one carries the cell from HOB 14 to a destination station.

The HOB 14 encounters two scenarios upon receiving a cell: already delivered (upstream-to-downstream) or not yet delivered (downstream-to-upstream). An undelivered cell must be immediately retransmitted through a new time slot. An empty slot is transmitted through if no undelivered cell is present.

The HOB 14 uses the PCR bit to test the delivery of an incoming cell. Because there is a one slot delay to determine the delivery status of an incoming cell, every cell coming to the HOB 14 must be buffered for at least one slot time before it can be either retransmitted or discarded. Therefore HOB 14 maintains a small buffer 900 for storing incoming cells.

FIG. 9 illustrates the structure of the HOB 14. All incoming cells are first buffered in Cell-Buffer-In 900. A cell buffering controller 902 monitors the PCR bit for every incoming cell. If that bit is set, the last cell stored in Cell-Buffer-In 900 was delivered, thus it can be discarded. Otherwise, the cell is transferred to Cell-Buffer-Out 904 for retransmission. The size of Cell-Buffer-Out is arbitrary, but preferably holding at least one cell. To guarantee a minimum latency for cell retransmission, the Cell-Buffer-Out 904 is preferably as small as possible. The cell buffering controller is also responsible for writing the buffered cells from Cell-Buffer-Out 904 into the outgoing slot stream 906.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A method of providing priority data transmission utilizing a medium access control protocol with a fair cell-access scheme in a local area network having a unidirectional looped bus and a plurality of network stations coupled to the bus for asynchronous cell transmissions from one network station to other network stations, said method comprising the steps of:

a) continuously generating time slots from a head-of-bus to the bus, each of the time slots including a busy bit, a high priority reserved bit, a low priority reserved bit, a high priority slot reservation bit, and a low priority slot reservation bit;

b) providing each of said plurality of network stations with said time slots to permit transport of high priority cells and low priority cells;

c) permitting delivery of a high priority cell from a given network station to its current time slot when neither the busy bit nor the high priority reserved bit is set in said current time slot, said given network station thereafter setting the busy bit;

d) permitting delivery of a low priority cell from a given network station to its current time slot if: (i) a high priority cell is not being delivered and ii) neither the busy bit nor the low priority reserved bit is set in said current time slot, said given network station thereafter setting the busy bit;

e) setting the high priority slot reservation bit in a current time slot at a given network station to reserve a future time slot from the head-of-bus when the busy bit is set and the high priority slot reservation bit is not set in said current time slot;

f) setting the low priority slot reservation bit in a current time slot at a given network station to reserve a future time slot from the head-of-bus if (i) the high priority slot reservation bit is not being set and (ii) the busy bit is set and the low priority slot reservation bit is not set in said current time slot;

g) said head-of-bus generating a time slot to said bus and setting the high priority reserved bit in said time slot to indicate that a time slot has been reserved for high priority cell transmission when a time slot with the high priority slot reservation bit set is received by said head-of-bus;

h) said head-of bus generating a time slot to said bus and setting the low priority reserved bit in said time slot to indicate that a time slot has been reserved for low priority cell transmission when a time slot with the low priority slot reservation bit set is received by said head-of bus;

i) delivering a high priority cell from a given network station to its current time slot if: (i) said network station had recently set the high priority slot reservation bit, (ii) the busy bit is not set and (iii) the high priority reserved bit is set in said current time slot; and j) delivering a low priority cell from a given network station to its current time slot if: (i) said network station had recently set the low priority slot reservation bit, (ii) the busy bit is not set and (iii) the low priority reserved bit is set in said current time slot.

2. A method as claimed in claim 1, wherein each of the time slots further includes a previous cell received bit which is set in the next immediate slot by one of said plurality of network stations to indicate a reception of the high priority or low priority cell.

3. A method as claimed in claim 2, further comprising the step of holding an incoming high priority or low priority cell for at least a one-slot delay in a cell buffer by the head-of-bus so as to determine whether the incoming high priority or low priority cell is to be discarded or relayed to the bus.

4. A method as claimed in claim 3, further comprising the step of discarding the last incoming high priority or low priority cell held in the cell buffer by the head-of-bus if the previous cell received bit is set in a current incoming high priority or low priority cell and issuing an empty time slot to the bus.

5. A method as claimed in claim 4, further comprising the step of relaying the incoming high priority or low priority cell held previously in the cell buffer by the head-of-bus if the previous cell received bit is not set in the current incoming high priority or low priority cell.

6. A method as claimed in claim 5, wherein each of the time slots further includes a cell circulation bit which is set in an outgoing slot by the head-of-bus when the outgoing slot contains a high priority or low priority cell that is relayed by the head-of-bus.

7. A method as claimed in claim 6, further comprising the step of discarding the current incoming high priority or low priority cell by the head-of-bus if the cell circulation bit is set in the current incoming high priority or low priority cell and the previous cell reserved bit is not set in the next immediate cell so as to prevent bandwidth lost from cell recirculation.

8. An apparatus for priority data transmission utilizing a medium access control protocol with a fair cell-access scheme in a local area network having an unidirectional looped bus and a plurality of network stations coupled to the bus for asynchronous cell transmission from one network station to other network stations, said apparatus comprising:
- a) a head-of-bus for generating continuously time slots to the bus, each of the time slots including a busy bit, a high priority reserved bit, a low priority reserved bit, a high priority slot reservation bit and a low priority slot reservation bit, each of said time slots permitting transport of high priority cells and low priority cells;
- b) a given one of said plurality of network stations delivering a high priority cell to its current time slot when neither the busy bit nor the high priority reserved bit is set in said current time slot, said given network station thereafter setting the busy bit;
- c) a given one of said plurality of network stations delivering a low priority cell to its current time slot if: (i) a high priority cell is not being delivered and (ii) neither the busy bit nor the low priority reserved bit is set in said current time slot, said given network station thereafter setting the busy bit;
- d) a given one of said plurality of network stations setting the high priority slot reservation bit in its current time slot to reserve a future time slot from the head-of-bus when the busy bit is set and the priority slot reservation bit is not set in said current time slot;
- e) a given one of said plurality of network stations setting the low priority slot reservation bit in its current time slot to reserve a future time slot from the head-of-bus if (i) the high priority slot reservation bit is not being set, (ii) the busy bit is set and (iii) the low priority slot reservation bit is not set in said current time slot;
- f) said head-of-bus generating a time slot to the bus and setting the high priority reserved bit in said generated time slot to indicate that a time slot has been reserved for high priority cell transmission when a time slot with the high priority slot reservation bit set is received by said head-of-bus;
- g) said head-of bus generating a time slot to the bus and setting the low priority reserved bit in said generated time slot to indicate that a time slot has been reserved for low priority cell transmission when a time slot with the high priority slot reservation bit set is received by said head-of-bus;
- h) a given one of said plurality of network stations delivering a high priority cell to its current time slot if: (i) said given network station had recently set the high priority slot reservation bit, (ii) the busy bit is not set in said current time slot and (iii) the high priority reserved bit is set in said current time slot; and
- i) a given one of said plurality of network stations delivering a low priority cell to its current time slot if: (i) said given network station had recently set the low priority slot reservation bit, (ii) the busy bit is not set in said current time slot and (iii) the low priority reserved bit is set in said current time slot.

9. An apparatus as claimed in claim 8, wherein each of the time slots further includes a previous cell received bit which is set in the next immediate slot by one of said plurality of network stations to indicate a reception of the high priority or low priority cell.

10. An apparatus as claimed in claim 9, further comprising means for holding an incoming high priority or low priority cell for at least a one-slot delay in a cell buffer by the head-of-bus so as to determine whether the high priority or low priority incoming cell is to be discarded or relayed to the bus.

11. An apparatus as claimed in claim 10, further comprising means for discarding the last incoming high priority or low priority cell held in the cell buffer by the head-of-bus if the previous cell received bit is set in a current high priority or low priority incoming cell and issuing an empty time slot to the bus.

12. An apparatus as claimed in claim 11, further comprising means for relaying the incoming high priority or low priority cell held previously in the cell buffer by the head-of-bus if the previous cell received bit is not set in the current incoming high priority or low priority cell.

13. An apparatus as claimed in claim 12, wherein each of the time slots further includes a cell circulation bit which is set in an outgoing slot by the head-of-bus when the outgoing slot contains a high priority or low priority cell that is relayed.

14. An apparatus as claimed in claim 13, further comprising means for discarding the current incoming high priority or low priority cell by the head-of-bus if the cell circulation bit is set in the current incoming high priority or low priority cell and the previous cell reserved bit is not set in the next immediate cell so as to prevent slot wastage from cell recirculation.

15. A method of providing n-level priority data transmission utilizing a medium access control protocol with a fair cell-access scheme in a local area network having an unidirectional looped bus and a plurality of network stations coupled to the bus for asynchronous cell transmission from one network station to other network stations, said method comprising the steps of:
- a) continuously generating time slots from a head-of-bus to the bus, each of the time slots including a busy bit, n priority reserved bits, and n priority slot reservation bits where n is a number greater than or equal to 2;
- b) providing each of said plurality of network stations with said time slots to permit transport of priority cells;
- c) permitting delivery of a priority cell of a given priority level from a given network station to its current time slot if (i) the busy bit is not set in said current time slot and (ii) any priority reserved bits having priority levels higher than said given priority level are not set in said current time slot, said given network station thereafter setting the busy bit;
- d) setting the priority slot reservation bit of a given priority level in a current time slot at a given network station to reserve a future time slot from the head-of-bus if (i) the busy bit is set and (ii) no priority slot reservation bits having priority levels higher than said given priority level are set in said current time slot;
- e) said head-of-bus generating a time slot to said bus and setting the priority reserved bit of a given priority level in said generated time slot to indicate that a time slot has been reserved for priority cell transmission of said given priority level when a slot having the priority slot reservation bit of said given priority level set is received by said head-of-bus;
- f) delivering a priority cell of a given priority level from a given network station to its current time slot if: (i)

said given network station had recently set the priority slot reservation bit of said given priority level, (ii) the busy bit is not set in said current time slot and (iii) the priority reserved bit of said given priority level is set in said current time slot.

16. An apparatus for n-level priority data transmission utilizing a medium access control protocol with a fair cell-access scheme in a local area network having a unidirectional looped bus and a plurality of network stations coupled to the bus for asynchronous cell transmission from one network station to other network stations, said apparatus comprising:

a) a head-of-bus for generating continuously time slots to the bus, each of the time slots including a busy bit, n priority reserved bits, and n priority slot reservation bits where n is a number greater than or equal to 2, each of said time slots permitting transport of priority cells;

b) a given one of said plurality of network stations delivering a priority cell of a given priority level to its current time slot if (i) the busy bit is not set and (ii) any priority reserved bits having priority levels higher than said given priority level are not set in said current time slot, said given network station thereafter setting the busy bit;

c) a given one of said plurality of network stations setting the priority slot reservation bit of a given priority level in its current time slot to reserve a future time slot from the head-of-bus if (i) the busy bit is set and (ii) no priority slot reservation bits having priority levels higher than said given priority level are set in said current time slot;

d) said head-of-bus generating a time slot to said bus and setting the priority reserved bit of a given priority level in said generated time slot to indicate that a time slot has been reserved for priority cell transmission of said given priority level when a time slot having its priority slot reservation bit of said given priority level set is received by said head-of-bus; and e) a given one of said plurality of network stations delivering a priority cell of a given priority level to its current time slot if: (i) said given network station had recently set a priority slot reservation bit of said given priority level, (ii) the busy bit is not set in said current time slot, and (iii) the priority reserved bit of said given priority level is set in said current time slot.

17. A method of providing asynchronous priority data transmission utilizing a medium access control protocol with a fair cell-access scheme in a local area network having a plurality of network stations coupled to a unidirectional looped bus having a head-of-bus, the method comprising the steps of:

a) continuously generating time slots from the head-of-bus, each of said time slots permitting asynchronous priority data transmission between said network stations and each having a busy bit, high and low priority reserved bits and high and low priority slot reservation bits;

b) permitting delivery of high or low priority cells from a given network station to its current time slot when neither the busy bit nor either priority reserved bit is set in said current time slot, said given network station thereafter setting the busy bit;

c) setting one of said high or low priority slot reservation bits in a current time slot at a given network station to reserve a future time slot from the head-of-bus if the busy bit is set but (i) neither priority slot reservation bit is set in the case of a low priority reservation or (ii) the high priority slot reservation bit is not set in the case of a high priority reservation; and d) permitting delivery of either a high or low priority cell from a given network station to its current time slot if: (i) said given network station had recently set the corresponding high or low slot reservation bit, (ii) the busy bit is not set and (iii) the corresponding high or low priority reserved bit is set, said network station thereafter setting the busy bit.

* * * * *